(12) United States Patent
Nir et al.

(10) Patent No.: US 7,043,265 B2
(45) Date of Patent: May 9, 2006

(54) PROVIDING TIME SYCHRONIZATION TO A GPS LOCATOR

(75) Inventors: Joseph Nir, Rehovot (IL); Baruch Shayevits, Rishon Lezion (IL); Hanoch Cohen, Rishon Lezion (IL)

(73) Assignee: Cellguide Ltd., Rehovot (IL)

( * ) Notice: Subject to any disclaimer, the term of this patent is extended or adjusted under 35 U.S.C. 154(b) by 447 days.

(21) Appl. No.: 10/221,475

(22) PCT Filed: Mar. 26, 2001

(86) PCT No.: PCT/US01/09591

§ 371 (c)(1),
(2), (4) Date: Sep. 13, 2002

(87) PCT Pub. No.: WO01/76285

PCT Pub. Date: Oct. 11, 2001

(65) Prior Publication Data

US 2003/0040869 A1 Feb. 27, 2003

Related U.S. Application Data

(60) Provisional application No. 60/193,235, filed on Mar. 30, 2000.

(51) Int. Cl.
*H04B 7/01* (2006.01)

(52) U.S. Cl. .............. 455/502; 455/456.1; 342/357.06; 342/358

(58) Field of Classification Search ............... 455/502, 455/456.1, 517, 65, 272; 342/357.1, 357.06, 342/358; 701/213–215
See application file for complete search history.

(56) References Cited

U.S. PATENT DOCUMENTS

| | | | |
|---|---|---|---|
| 5,945,944 A | 8/1999 | Krasner | 342/357.06 |
| 6,204,808 B1 * | 3/2001 | Bloebaum et al. | 342/357.07 |
| 6,430,416 B1 * | 8/2002 | Loomis | 455/456.1 |
| 6,433,734 B1 * | 8/2002 | Krasner | 342/357.09 |
| 6,603,978 B1 * | 8/2003 | Carlsson et al. | 455/502 |
| 2001/0012760 A1 * | 8/2001 | Avis | 455/13.2 |

OTHER PUBLICATIONS

U.S. Appl. No. 09/585,619, filed Mar. 26, 2001, Nir et al.
"Understanding GPS Principles and Applications" Kaplan Artech House Publications 1996.

* cited by examiner

*Primary Examiner*—Lee Nguyen
(74) *Attorney, Agent, or Firm*—Mark M. Friedman

(57) ABSTRACT

A method and system for knowing positioning system standard time at a mobile unit with respect to a system, such as the Global Positioning System, when normal, direct measurement may be impracticable owing to low signal-to noise ratio, by calibrating the timing signal of an available communication network, such as a cellular telephone transmission network (610, 615). A time reference is set for the communication network with respect to the positioning system at a time when an adequate signal-to-noise ratio prevails and the offset of a timing event in the communication network control signal measured by means of the mobile unit's internal clock may be determined (620, 625). Subsequent times are measured with respect to this time reference by using the internal clock to measure time intervals therefrom.

14 Claims, 4 Drawing Sheets

Flow Chart

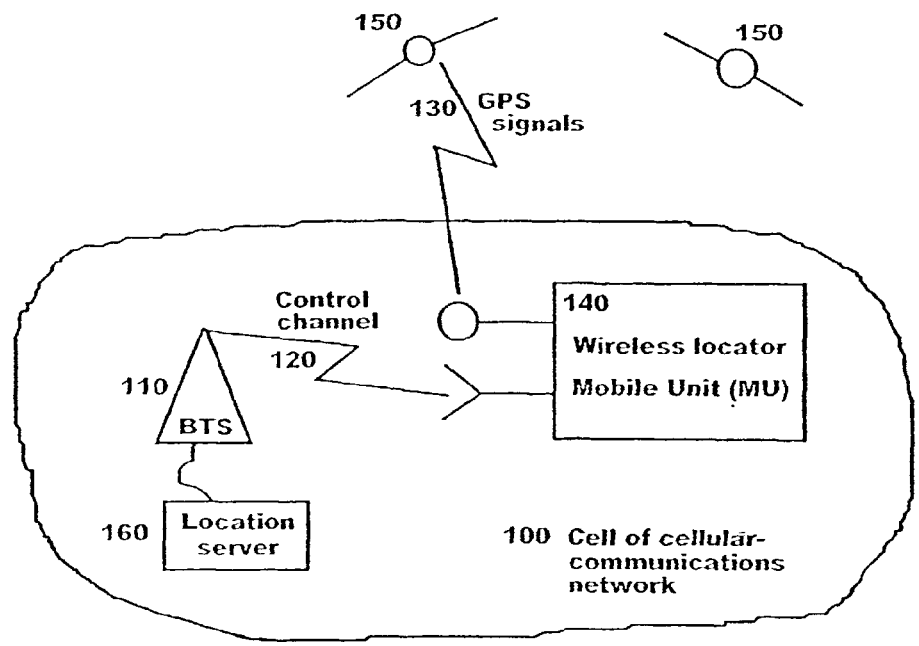
Figure 1 — System elements
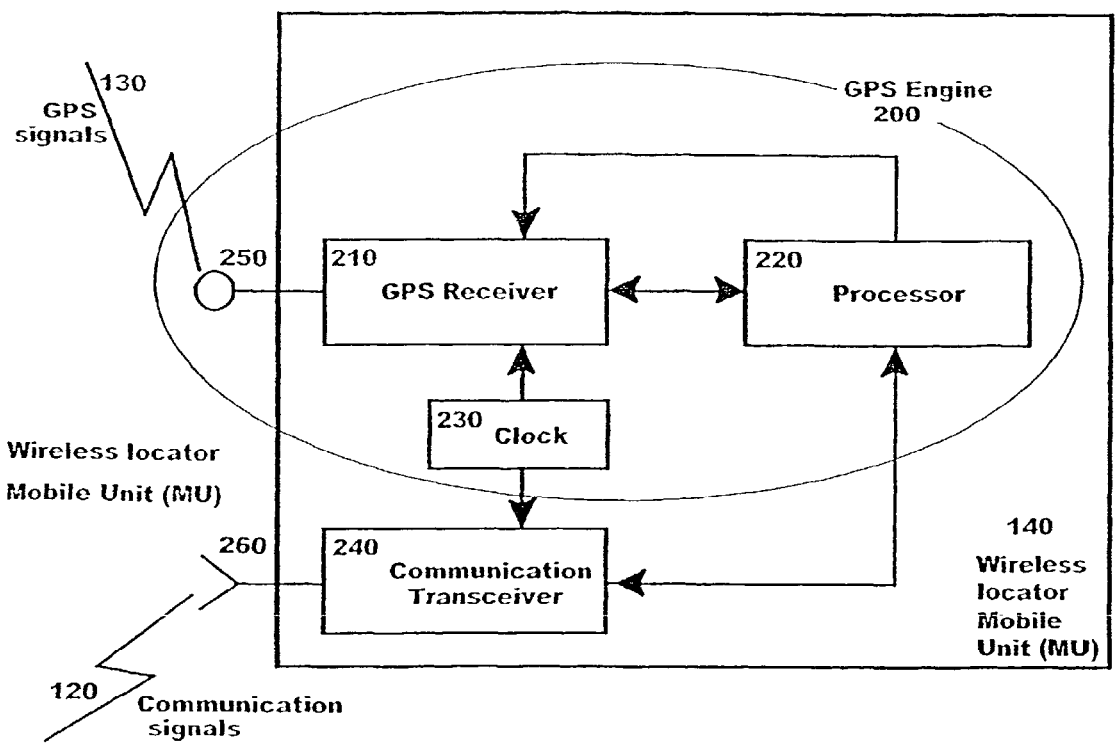
Figure 2 — Wireless locator mobile unit

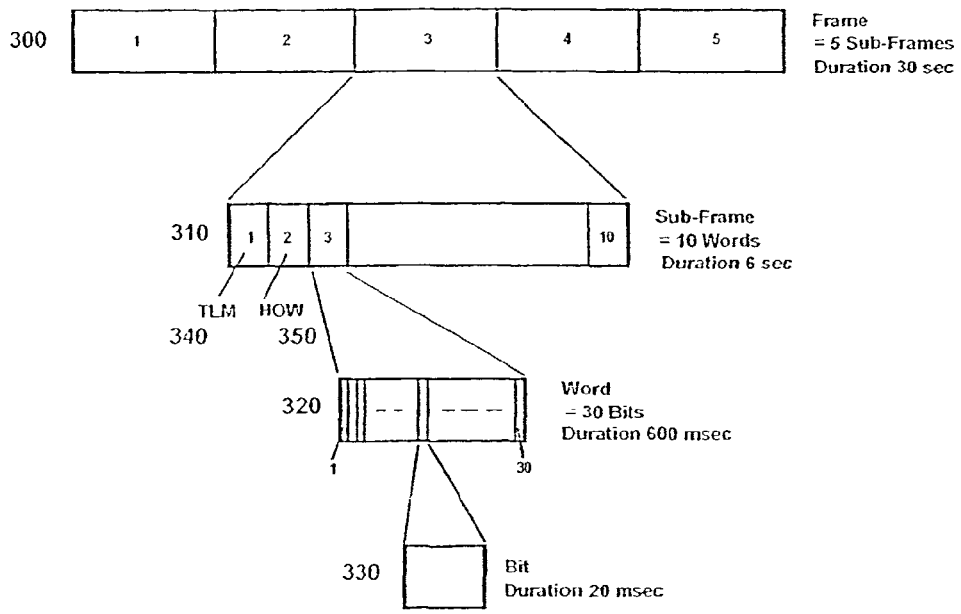
Figure 3 — GPS Navigation message structure
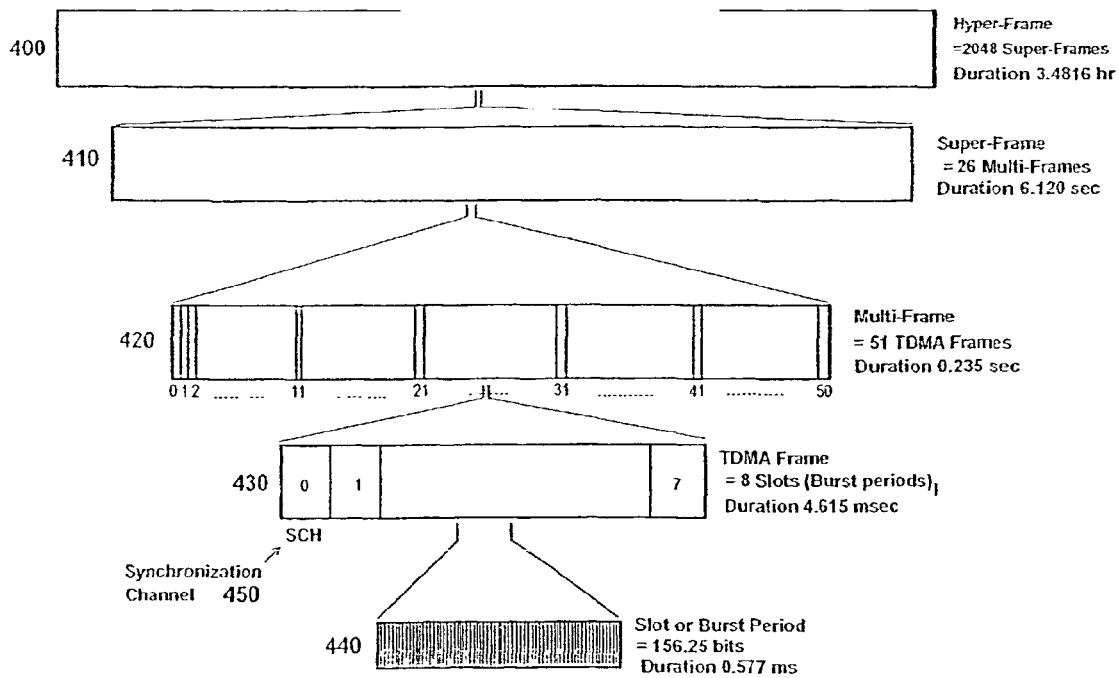
Figure 4 — Frame structure of the GSM control channel

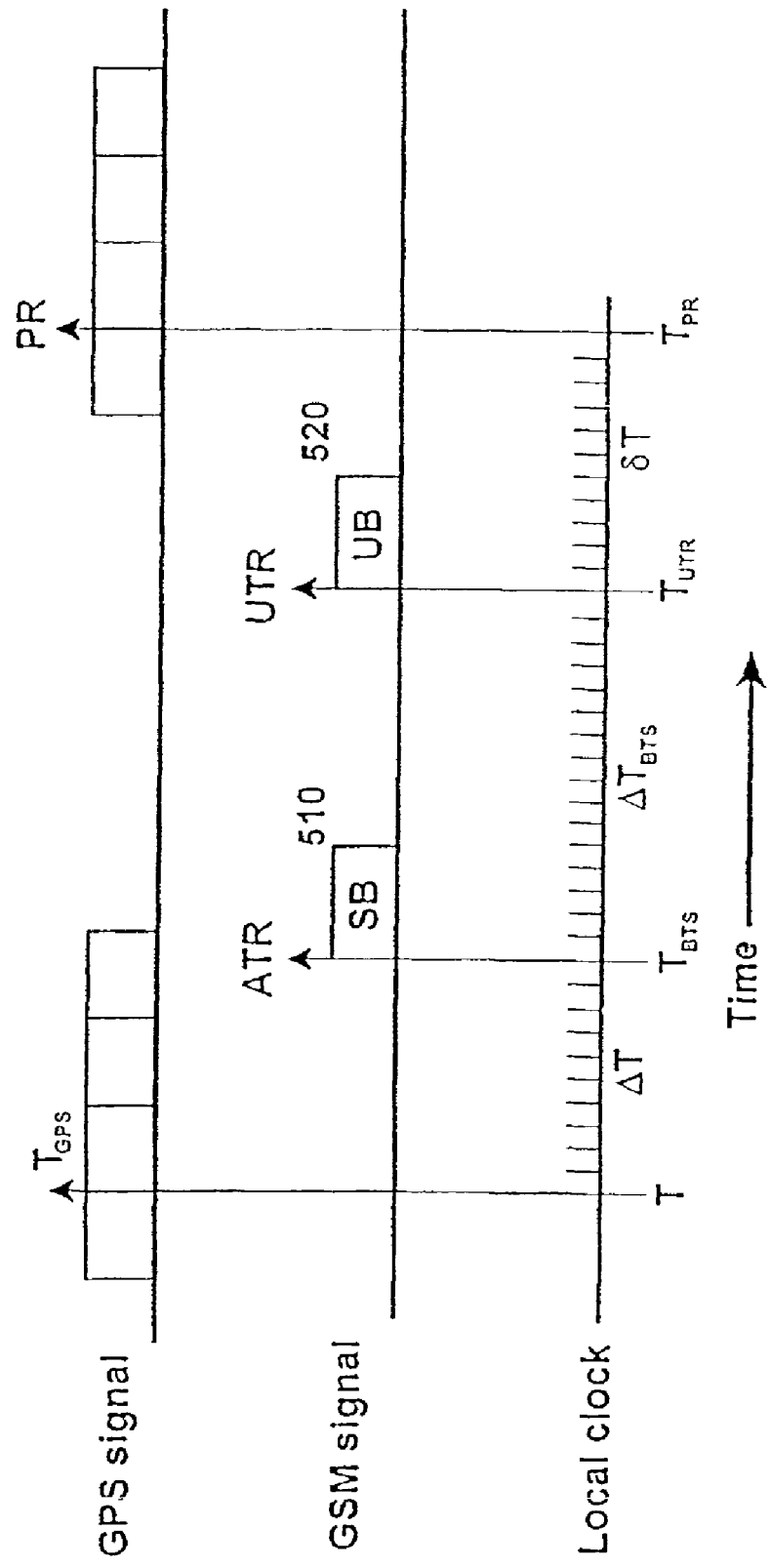
Figure 5 — Time synchronization and time update

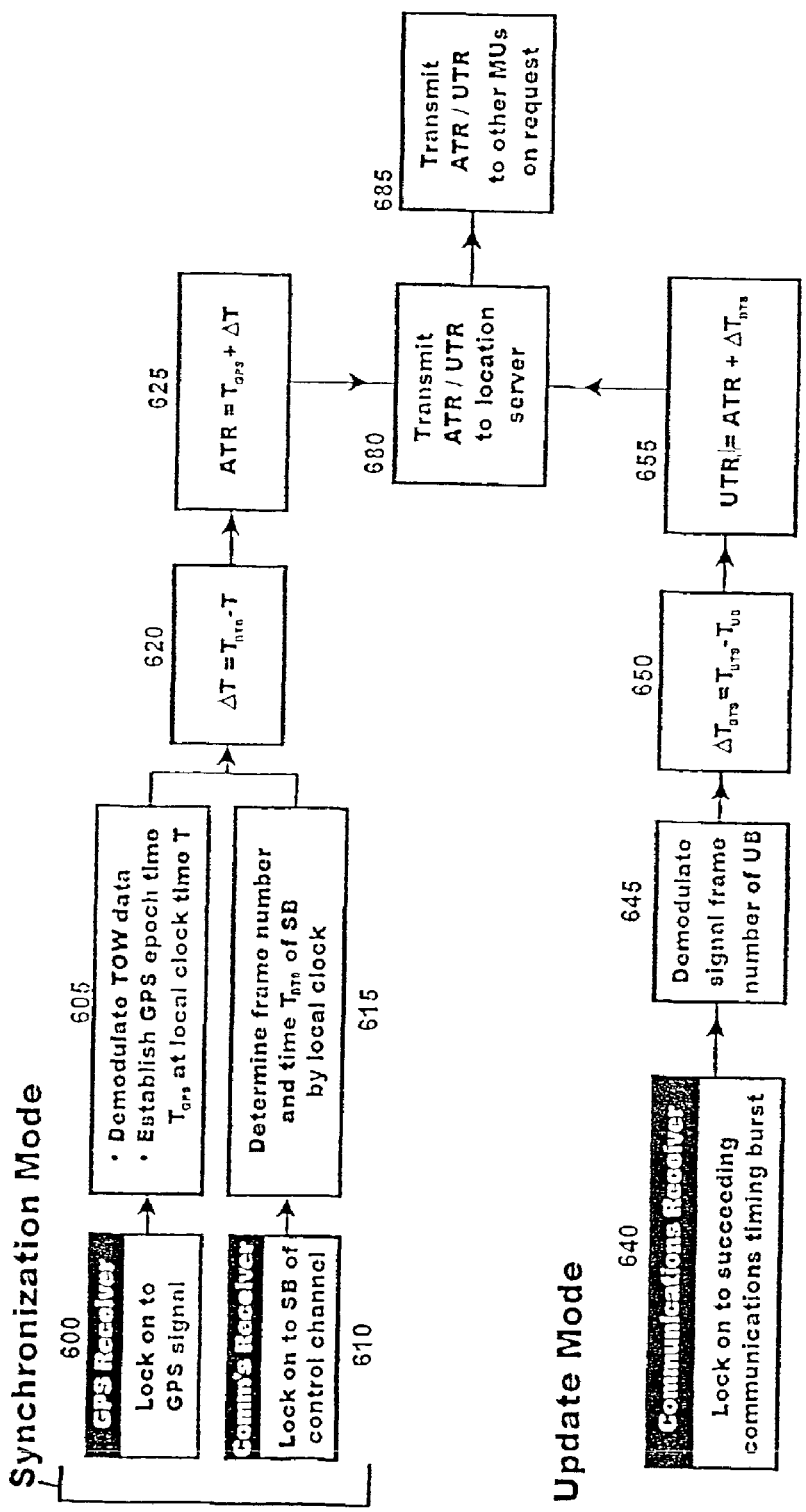
Figure 6 — Flow Chart

PROVIDING TIME SYCHRONIZATION TO A GPS LOCATOR

This application claims benefit of 60/193,235, filed Mar. 30, 2000.

FIELD AND BACKGROUND OF THE INVENTION

The present invention relates generally to the field of positioning systems and, more particularly, to providing time synchronization to Earth satellite navigation system receivers. The invention is described in terms of the Global Positioning System (GPS) but is applicable to similar systems, such as Glonass.

The present invention makes use of a terrestrial, communications network, such as a cellular communications network. In particular, the use of the Global System for Mobile (GSM) network is instanced.

The operation of the present invention sill be better understood with reference to FIGS. 3 and 4, that respectively describe features of the GPS navigation data message and of the GSM signal control channel, and to FIG. 1, that shows the elements of the disclosed invention.

GPS Fundamentals

A GPS locator determines its position by measuring the transit time of signals transmitted simultaneously from a plurality of satellite-borne beacons in the Navstar satellite constellation, inferring therefrom the ranges from the respective beacons, and, from the known locations of the respective beacons at time of transmission, triangulating the ranges to fix a locator position. Normally, the beacons are satellite-borne, but the system may also include fixed, ground-based beacons at known locations, called "pseudolites", that emulate the signal structure of the satellites to compensate for limited or no satellite visibility. References to satellites or beacons in the following may be taken also to include pseudolites.

The Navstar constellation consists of 24 satellites orbiting the earth every 12 hours. The positions of all satellites are known at all times. This constellation provides any user with 5–8 visible satellites at any time. Each satellite transmits a continuous, unique pseudo-random noise (PN) sequence, or C/A (coarse acquisition) code, at a chip rate of 1023 kHz and a repetition period of 1023 chips (=1 millisecond). The 1023 chips of the C/A code constitute a frame. The several PN sequences from the satellites are mutually orthogonal and have good correlation properties A 50 Hz navigation or satellite data message (SDM) is superimposed on the PN sequence of each satellite. This data message includes satellite position and velocity data (Almanac—approximate orbital data parameters for all satellites—and Ephemeris—frequently updated parameters describing short sections of the satellite orbits), clock timing data, and transmit time of week (TOW) data, according to GPS system or standard time. The data is sufficient to enable a GPS receiver to compute the respective positions and velocities of the several satellites at any time.

The SDM consists of a sequence of data frames, 300 in FIG. 3, each having five sub-frames 310. Each sub-frame 310 is, in turn, subdivided into ten words 320, each word containing thirty bits 330. The first two words of each sub-frame 310 are the telemetry word (TLM) 340 and the hand-over word (HOW) 350.

A GPS receiver's processor locks onto a particular visible satellite's signal by correlation with a locally stored copy of that satellite's PN sequence. After lock-on has occurred, the processor demodulates the GPS signal to decode the positioning and time data (ephemeris and TOW) from the GPS carrier signal.

The correlation peaks obtained during continued tracking of the satellites provide times of arrival of the PN sequence frames, as measured by a local clock in the GPS receiver. The differences between an arbitrary reference time and measured times of arrival from each satellite, multiplied by the speed of light, are pseudo-ranges $\rho$ from those satellites to the GPS receiver. Typically, the reference time is the (common) time at which the satellites commenced transmission of their respective PN sequences, as measured by the GPS receiver clock. This clock usually differs from the GPS system clock by an unknown time offset, $T_0$. The pseudo-range $\rho$ is related to the true range R of the respective satellite by $\rho = R + c_b$, where the range offset, $c_b = cT_0$, c being the speed of light.

The pseudo-ranges are computed from the correlator output from at least four satellites. Using these computed pseudo-ranges and the known satellite positions at transmit time, a position is fixed by triangulation. Pseudo-ranges to at least four satellites are needed to solve at least four simultaneous equations of the form:

$$|s-r| = \rho - c_b$$

where s is the position vector of a satellite and r=(x,y,z) is the position vector of the GPS receiver, for the three unknown Cartesian coordinates x, y, z, and for $c_b$. The satellites are sufficiently far from the GPS receiver that these equations can be linearized in x, y, and z with no loss of accuracy.

Thus a standard GPS locator calculates position by solving the equation:

$$|s_j(t) - r(t)| = R_j(t) = \rho_j(t) - cT_b$$

where:

$s_j(t)$ and r(t) are the respective position vectors of the $j^{th}$ satellite 150 (see FIG. 1) of the GPS constellation and mobile unit 140 at transmission time t;

$R_j(t)$ is the absolute distance of mobile unit 140 from the $j^{th}$ satellite 150 at transmission time t;

$\rho_j(t)$ is the pseudo-range measured to the $j^{th}$ satellite 150 at transmission time t;

c is the velocity of light; and $T_b$ is the clock bias of local time (mobile clock time) with respect to absolute (GPS system) time, hereafter referred to as standard time.

$\rho_j(t)$ is measured by correlating the incoming GPS signal with a locally stored copy of the signal transmitted from the $j^{th}$ satellite 150, thereby deducing the signal transit time from the $j^{th}$ satellite 150, and converting that transit time to distance.

$s_j(t)$ is calculated from the demodulated position and timing data superimposed on the PN signal.

A comprehensive account of the GPS system may be found in *Understanding GPS: Principles and Applications*, Elliott D. Kaplan, ed., Artech House Publications, 1996, which is incorporated by reference for all purposes as if flly set forth herein.

GSM Data Structure

GSM operates on a plurality of carrier frequencies within a reserved frequency band. These frequencies, or a sub-set thereof, are allocated to a base station 110 in each cell of the network. Each carrier frequency is partitioned in time, using a TDMA (Time-Division Multiple-Access) scheme which is illustrated in FIG. 4, into slots or burst periods 440 of $^{15}/_{26}$ ms (≈0.577 ms) each containing 156.25 bits. Eight slots, or burst periods, are grouped into a TDMA frame 430 ($^{120}/_{26}$ ms, ≈4.615 ms). Frames 430 are grouped to form multi-frames 420. The number of TDMA frames per multi-frame depends upon Whether the channels are used as traffic channels (26 frames), which are transiently assigned to individual mobile units to carry speech and data, or as network control channels (51 frames). The latter is illustrated in FIG. 4. Super-frames 410 consist of 51 multi-frames 420 (for traffic), or 26 (for control). Hyper-frames 400 contain 2048 super-frames 410 and span 3.4816 hr. A logical channel corresponds to a specific time slot 440 within successive TDMA frames 430.

In the case of signal control channels, lime-slot zero of each TDMA frame forms a logical channel, as described above, and is utilized, inter alia, as a frequency-correction and a synchronization channel (SCH) 450. This serves to synchronize a GSM mobile unit to the time-slot structure of a network cell by defining the boundaries of burst periods and time-slot numbering. Synchronization channel 450, in distinction to traffic channels, is one of a group of common channels accessible to all mobile units. Common channels are defined within a 51-frame multi-frame 420. The present invention, as disclosed, exploits the SCH but other embodiments might utilize other features of the GSM signal structure to the same end.

GSM employs four types of burst, distinguished by internal structure and, in one case, length. The S burst, used on the synchronization channel, consists of 156.25 bits transmitted in a slot length of 0.577 ms.

Because the GSM signal has a known and precisely regulated structure, it is possible to know the time interval between two identified events in that signal.

GPS Operation

The standard GPS process outlined above has severe drawbacks in urban areas, where signal blockage may result in a signal-to-noise ratio too low to allow demodulation of the data message bits (20 ms bit duration) in order to decode the satellite navigation data message and therefrom compute a location, even though the receiver can acquire and track the signals. In this event, the PR may still be measured with sufficient accuracy by operating coherently on longer signal strings (~100–1000 ms), thus achieving an enhanced signal-to-noise ratio, as taught in co-pending U.S. patent application Ser. No. 09/585,619.

Krasner, in U.S. Pat. No. 5,945,944, Method and apparatus for determining time for GPS receivers, discloses a method for providing GPS standard time to a wireless GPS locator operating within the coverage area of a cell-based communication network The GPS receiver includes an auxiliary receiver suitable for the cell-based network and acquires GPS standard time by communicating measurements of pseudo-ranges and received GPS time indicators to a GPS base station where a position is calculated and transmitted back to the mobile unit, all via the cell-based network. But this method also suffers a drawback in that it requires the addition of a GPS base station connected to the cell-based network.

There is thus a need for, and it would be highly advantageous to have, an alternative method and system of providing GPS standard time to a wireless GPS receiver.

SUMMARY OF THE INVENTION

According to the present invention, there is provided a method for calibrating a network time of a communications network that has at least one cell and that transmits a control channel signal including a plurality of known bit sequences according to the network time from at least one base transceiver station into at least one cell of the communications network, to provide an absolute time reference for a local clock in a mobile unit located in one of the at least one cell including the steps of: (a) providing: (i) a source of standard time that transmits at least one synchronization signal; and (ii) a transceiver operative to communicate with the communications network and with the mobile unit; (b) synchronizing the local clock with the standard time; (c) synchronizing the network time of the communications network with the local clock; (d) calculating a time offset, according to the local clock, of the network time of the communications network from standard time; and (e) calculating an absolute time reference as a sum of the time offset and the standard time.

According to the present invention, the method includes the further step of providing at least one location server communicating with at least one base transceiver station for storing the absolute time reference.

According to the present invention, the method includes the further step of: (h) providing the absolute time reference to the location server.

According to the present invention, providing the absolute time reference to the location server is effected by steps including: (i) transmitting the absolute time reference by the associated transceiver to the base transceiver station; and (ii) communicating the absolute time reference by the base transceiver station to the location server.

According to the present invention, the source of the standard time includes an Earth satellite navigation system.

According to the present invention, synchronizing the local clock with the standard time is effected by steps including: (i) receiving at least one synchronization signal by the mobile unit; and (ii) noting a time according to the local clock when a known bit sequence of the synchronization signal is received.

According to the present invention, synchronizing communications network time is effected by steps including: (i) receiving the control channel signal of the communications network from at least one base transceiver station by the transceiver; and (ii) noting a time according to the local clock when a known bit sequence is received.

According to the present invention, the synchronizing of communications network time includes the further step of: (iii) updating the absolute time reference to provide an updated time reference to the mobile unit.

According to the present invention, updating the absolute time reference is effected by steps including: (A) receiving the control channel signal of the communications network from at least one base transceiver station by the transceiver; (B) demodulating the frame number of a subsequent known bit sequence in the control channel signal; (C) noting the time, according to the local clock, when the subsequent known bit sequence is received; (D) calculating from known network signal characteristics the time difference, according to the communications network, between the first known bit sequence and the subsequent known bit sequence; and (E) correcting the local clock time according to the time difference.

According to the present invention, updating the absolute time reference is performed at least twice per day.

According to the present invention, the time offset is the time period, according to the local clock, between the reception of a known bit sequence within the synchronization signal and reception of a known bit sequence within the control channel signal.

According to the present invention the method includes the further steps of: (f) determining, according to the local clock, the time offset of a subsequent event from the most recent time reference; and (g) adding the time offset thereto.

According to the present invention, the most recent time reference is received from the location server via the base transceiver station serving the cell wherein the mobile unit is located.

BRIEF DESCRIPTION OF THE DRAWINGS

The invention is herein described, by way of example only, with reference to the accompanying drawings, wherein:

FIG. 1 depicts the system elements;

FIG. 2 is a block diagram representation of the wireless locator mobile unit;

FIG. 3 is a chart describing the GPS navigation message structure;

FIG. 4 is a chart describing, by way of example, the frame stricture of the GSM control channel including synchronization bursts;

FIG. 5 is a diagram showing timing information related to time synchronization and time update; and FIG. 6 is a flow chart showing two modes of operation of the process described in the invention.

DESCRIPTION OF THE PREFERRED EMBODIMENTS

The present invention is of a device and method for calibrating network time of a terrestrial wireless communications network against standard time of an Earth-satellite navigation system and subsequently using calibrated network time in place of directly obtained standard time in circumstances when the standard time is difficult to get. The invention is described in terms of the Global Positioning System (GPS) but is applicable to similar systems, such as Glonass. The calibrated network time is obtained and updated in a mobile GPS unit through signals transmitted by the wireless communications network (for example, a cellular network) which covers the operation area of the GPS device.

GPS standard timing information from an external source may be essential for enabling a location fix in urban areas where demodulation of the 50 Hertz SDM information may otherwise not be possible because of blockage of signals by urban structures.

Fundamentals of the Present Invention

The principles and operation of a GPS wireless locator or Mobile Unit (MU), according to the present invention, may be better understood with reference to the drawings and the accompanying description.

FIG. 1 illustrates a wireless locator mobile unit (MU) 140, capable of receiving both the signals 130 transmitted by GPS satellites 150 (only two satellites are shown, distinguished by subscripts j and j'), and the control channel 120 transmitted by a Base Transceiver Station (BTS) 110 of a cell-based network within a cell 100 thereof wherein unit 140 operates. Optionally, a location server 160 may communicate with mobile unit 140 via the communications network. Location server 160 may include reference data passed thereto and may also calculate locations for MU 140 and for other MUs in cell 100, if required.

The method disclosed in the present invention relates to a situation where the position, $s_j(t)$, of satellite 150$_j$ at transmission time, t, cannot be generated in the GPS device because of low signal-to-noise ratio that prevents extraction of the needed timing data in that signal.

To overcome this difficulty, mobile unit 140 uses communication control signals 120 transmitted by a communication network having a coverage area wherein mobile unit 140 is located. For illustrative purposes, the invention is described in relation to a GSM telephony network, although any suitable communications network may be used.

Wireless locator 140 (depicted in block-diagram form in FIG. 2) includes:

A GPS engine 200 including: an antenna 250 capable of receiving signals 130 from GPS satellites 150, a GPS receiver 210, a processor 220 for performing correlation and location calculations, and a local clock 230; and A communications transceiver 240, which may be part of a standard cellular transceiver, connected to a communication antenna 260, able to receive a control channel of communication network signal 120, and to communicate with processor 220, the output of transceiver 240 being a digital signal which is further processed by GPS engine processor 220.

Optionally, transceiver 240 also transmits timing information from processor 220 to location server 160 via BTS 110 and receives timing information therefrom.

According to the present invention, wireless locator 140 operates in three modes, a synchronization mode, a time update mode, and a roaming mode. The relationship between time synchronization and time update is shown in FIG. 5, and the sequence of operations in the first two modes is depicted in the flow chart of FIG. 6.

Synchronization

Operation in this mode sets an absolute reference time (ATR) for Wireless locator 140. In a synchronization event, wireless locator 140 ascertains GPS standard time by locking onto at least one sufficiently strong GPS satellite signal 130 that is in view during idle time, by using correlation techniques (block 600 in FIG. 6).

As described in the background, signal 130 includes information about GPS standard time and identifiable markers, such as the start of a PN sequence, that enable signal 130 to be used to provide standard time to a suitably equipped receiver. Signal 130 will be referred to as a synchronization signal.

This procedure is standard in GPS devices. Once lock-on is achieved, the TOW data is demodulated and the GPS standard time, $T_{GPS}$, of the GPS epoch (1 ms GPS frame) is determined (block 605 and see also FIG. 5). According to local clock 230 this time is T.

Concurrently, communication receiver 240 detects a known event in the communication control channel of the local cell (block 610); for the purposes of discussion here, a synchronization burst (SB) 510 is assumed, although other suitable events might be used. After detection, processor 220 demodulates the frame number of this burst (block 615). According to local clock 230, the time difference between the GPS epoch (T) and the leading edge of SB 510 ($T_{BTS}$ by local clock 230) is (block 620):

$$\Delta T = T_{BTS} - T.$$

The Absolute Time Reference (ATR) of the leading edge of SB 510 according to GPS standard time is (block 625):

$$ATR = T_{GPS} + \Delta T$$

ATR time tags generated from time to time by mobile units 140 within cell 100 are optionally transmitted via cellular network 100 to location server 160 and stored therein as absolute cell-timing data (block 680) for local cell 100, and are available, on request (block 685), to other mobile units. This helps other mobile units that have missed a synchronization opportunity or that are roaming into cell 100.

In a cellular network where base stations are not synchronized (as in GSM and some other networks), the synchronization of the present invention is valid only within the cell where synchronization was performed. In networks, like CDMA, wherein base stations are synchronized, a time tag is valid for the whole network.

Time Update

In time update mode, previously set absolute time ATR is updated by communication transceiver 240 locking on to a succeeding incoming communication channel timing burst (block 640), herein referred to as an update burst (UB) 520, and demodulating a signal frame number thereof (block 645), thereby deducing the time difference $\Delta T_{BTS}$ between SB 510 and UB 520 (block 650) according to cellular network time, which is more accurate than local clock 230 time. $\Delta T_{BTS}$ is added to ATR, thereby establishing an Updated Time Reference (UTR) (block 655). As before, the update information is optionally provided (block 680) to location server 160. UTR may be extrapolated, using local clock 230 time, for any future time event required by GPS engine 200.

For example, if GPS engine 200 measures a pseudo-range (PR) to a visible satellite, the standard time, $T_{PR}$, of a received signal event, such as a PN frame start, can be calculated as:

$$T_{PR} = UTR + \delta T$$

where $\delta T$ is the time lapse from UTR to $T_{PR}$, as measured by local clock 230.

Since in most networks, the cellular network BTS network clock is stable (1 sec in $2 \times 10^8$ sec for GSM), a synchronization event taken only twice a day will suffice to maintain adequate accuracy. As an example, for a GSM network five hours after synchronization, the accumulated time offset is:

$$\Delta_{UTR} \approx 5 \times 3600 \times 2 \times 10^{-8} \text{sec} = 0.36 \text{ ms}$$

Thus, the UTR drifts less than 1 ms after five hours. Since the required accuracy for the PR for a navigation solution is $\leq 10$ ms, such an accuracy in the absolute time of reception at the GPS locator is higher than required for precise location.

Roaming

When roaming from one network cell to a second cell, the time difference, according to clock 230, between communication bursts transmitted by the respective cell base transceiver stations 110 (the BTS of one cell and the BTS of a second cell) is measured by clock 230. This observed time difference (OTD) is added to the first cell ATR, consequently establishing a new ATR that is valid in the second cell. This process is identical to the previously described time-update process, whereby OTD replaces UTR.

If optional location server 160 has been provided, then a roaming mobile unit 140 can call for a current UTR of the network cell just entered.

In the present invention, unlike Krasner (U.S. Pat. No. 5,945,944), attaching GPS standard time tags to the communication signals is not required, nor is there any need for a GPS base station. Absolute time is generated and updated in wireless locator MU 140 by using known communication signal 120.

Application to Event Timing

The GPS standard time of any event subsequent to any of the actions described above is obtained by adding a time lapse, according to local clock 230, to the most recent of ATR and UTR.

While the present invention has been described with respect to a limited clamber of embodiments and with reference to the GPS and GSM systems, it will be appreciated that variations, modifications, and other applications of the invention may be made.

What is claimed is:

1. A method for calibrating a network time of a communications network that has at least one cell and that transmits a control channel signal including a plurality of known bit sequences according to the network time from at least one base transceiver station into the at least one cell of the communications network, to provide an absolute time reference for a local clock in a mobile unit located in one of the at least one cell, comprising the steps of:
   a) providing:
      i) a source, of a standard time, that transmits at least one synchronization signal; and
      ii) a transceiver operative to communicate with the communications network and with the mobile unit;
   b) synchronizing the local clock with said standard time;
   c) synchronizing the network time of the communications network with the local clock;
   d) calculating a time offset, according to the local clock, of the network time of the communications network from said standard time; and
   e) calculating an absolute time reference as a sum of said time offset and said standard time.

2. The method of claim 1, further comprising the step of:
   f) providing at least one location server communicating with at least one said base transceiver station for storing said absolute time reference.

3. The method of claim 2, further comprising the step of:
   g) providing the absolute time reference to said location server.

4. The method of claim 3 wherein providing the absolute time reference to said location server is effected by steps including:
   i) transmitting the absolute time reference by said associated transceiver to said base transceiver station; and
   ii) communicating said absolute time reference by said base transceiver station to said location server.

5. The method of claim 1, wherein said source of the standard time is an Earth satellite navigation system.

6. The method of claim 1, wherein said synchronizing of the local clock with said standard time is effected by steps including:
   i) receiving said at least one said synchronization signal by the mobile unit; and
   ii) noting a time according to said local clock when a known bit sequence of said at least one synchronization signal is received.

7. The method of claim 1, wherein said synchronizing of the network time of the communications network is effected by steps including:
  i) receiving the control channel signal of the communications network from the at least one base transceiver station by said transceiver; and
  ii) noting a time according to the local clock when one of the known bit sequences is received.

8. The method of claim 7, wherein said synchronizing of the network time of the communications network further includes the step of:
  iii) updating said absolute time reference to provide an updated time reference to the mobile unit.

9. The method of claim 8, wherein said updating of said absolute time reference is effected by steps including:
  A) receiving the control channel signal of the communications network from the at least one base transceiver station by said transceiver;
  B) demodulating a frame number of a subsequent known bit sequence in the control channel signal;
  C) noting a time according to the local clock when said subsequent known bit sequence is received;
  D) calculating from known network signal characteristics a time difference, according to the communications network, between said known bit sequence of claim 7 and said subsequent known bit sequence; and
  E) correcting the local clock time according to said time difference.

10. The method of claim 9, wherein said updating is performed at least twice per day.

11. The method of claim 1, wherein said time offset is a time period, according to the local clock, between said reception of a known bit sequence within said at least one synchronization signal and reception of a known bit sequence within the control channel signal.

12. The method of claim 1, further comprising the steps of
  f) determining, according to the local clock, a time offset of a subsequent event from a most recent time reference; and
  g) adding said time offset to said most recent time reference.

13. The method of claim 12, wherein said most recent time reference is received from said at least one location server via the at least one base transceiver station serving the at least one cell wherein the mobile unit is located.

14. The method of claim 1, wherein said synchronizing is effected independently of the communications network.

* * * * *